UNITED STATES PATENT OFFICE.

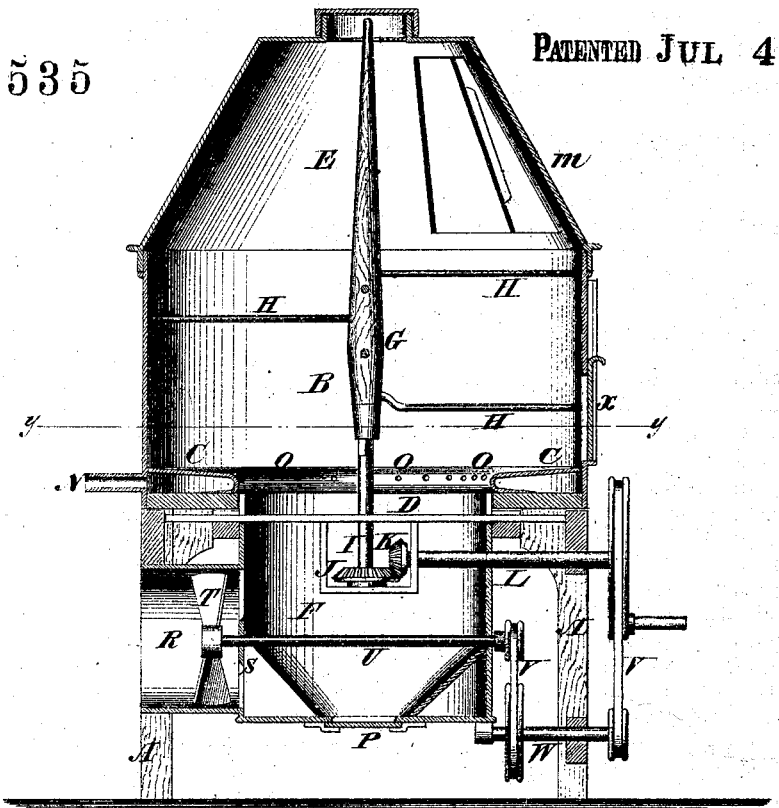
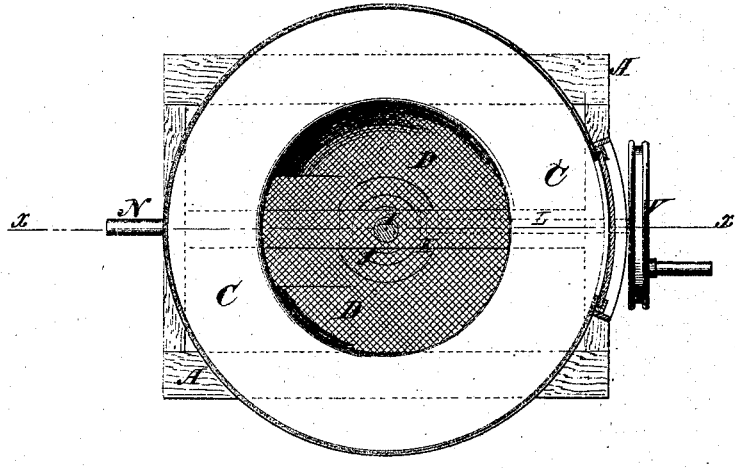

CHARLES E. BARBER AND WILLIAM DEAN, OF CENTRAL VILLAGE, CONNECTICUT, ASSIGNORS TO THEMSELVES AND GEORGE LORING, OF SAME PLACE.

IMPROVEMENT IN FEATHER-RENOVATORS.

Specification forming part of Letters Patent No. 116,535, dated July 4, 1871.

*To all whom it may concern:*

Be it known that we, CHARLES E. BARBER and WILLIAM DEAN, of Central Village, in the county of Windham and State of Connecticut, have invented a new and useful Improvement in Feather-Renovator; and we do hereby declare that the following is a full, clear, and exact description thereof, which will enable others skilled in the art to make and use the same, reference being had to the accompanying drawing forming part of this specification.

Our invention consists in improving feather-renovators, as hereinafter fully described and subsequently pointed out in the claim.

In the accompanying drawing, Figure 1 represents a vertical section of the machine taken on the line $x\ x$ of Fig. 2. Fig. 2 is a horizontal section taken on the line $y\ y$.

Similar letters of reference indicate corresponding parts.

A is a frame of suitable form, made of either wood or iron. B is the renovating-cylinder, provided with a double annular bottom, C, with a central gauze diaphragm, D, and with a conical removable top, E. F is a vertical cylinder, beneath the renovating-cylinder, into which the hot air is forced. G is a vertical shaft having horizontal arms H, more or less in number. The lower end of this shaft couples onto the top end of the short vertical shaft I, which latter shaft is revolved by means of the bevel-wheels J K. The wheel K is on the end of the horizontal crank-shaft L, and may be driven by hand or otherwise, as may be found most convenient. The feathers are introduced into the renovating-cylinder through the door $m$ in the conical top E. The shaft G is rotated and the feathers are agitated or stirred up by the rotating arms H. Steam is introduced into the annular double bottom C through the pipe N, and discharged into the cylinder B in jets through small perforations in the inner edge of the double bottom, as seen at O, and above the gauze diaphragm D. The bottom C is slightly concave, so that any dirt or foreign matter detached and separated from the feathers will find its way to the diaphragm or screen D, through which it will be discharged into the cylinder F. This cylinder has a funnel-shaped bottom and slide-door, P, through which all such matter, as well as any water of condensation, is discharged from the machine. In the center of the top E is a small perforated or gauze disk, through which steam may escape during the steaming process. R is a tube or cylinder, which is connected with an air-heater and with the cylinder F by the aperture S. T is an air-propelling wheel on the end of the horizontal shaft U. This propeller is rapidly revolved within the tube R from the driving-shaft L by means of belts V V and center-shaft W, as seen in the drawing. The propeller is so constructed and arranged that the air is drawn from the heater and forced into the chamber F and through the gauze diaphragm D into the renovating-cylinder in contact with the feathers. This is done after the feathers have been cleansed and the steam shut off, the feathers being all the time agitated by the rotating arms H. By the application of heated air while being thus stirred the feathers are soon dried and made "lively" and fresh as when new. The renovated feathers are discharged from the cylinder through the slide-door aperture seen at $x$. A sack or bed-tick is attached to the cylinder covering the aperture. The agitator being kept in motion, the feathers are forced out through the aperture into the sack or tick by the rotating arms.

By this machine the feathers are taken from the sack or from a bed-tick and thoroughly cleansed, dried, and renovated, and delivered back into the sack or tick without being handled by hand or exposed to the atmosphere, and in the most perfect and expeditious manner.

Having thus described our invention, we claim as new and desire to secure by Letters Patent—

The cylinder B having double bottom C, central gauze diaphragm D, and conical top E, the cylinder F thereunder having funnel-shaped door P and open at S, vertical shaft G having horizontal arms H, the tube R, and the shaft U having propelling-wheel T thereon, all constructed and arranged together, as and for the purpose specified.

CHAS. E. BARBER.
WILLIAM DEAN.

Witnesses:
JOHN W. KENNEDY,
DANIEL P. ANGELL.